(12) United States Patent
Byrd et al.

(10) Patent No.: US 7,752,130 B2
(45) Date of Patent: Jul. 6, 2010

(54) METHODS AND SYSTEMS FOR DELIVERY OF INFORMATION UPON ENROLLMENT IN AN INTERNET BILL PRESENTMENT AND PAYMENT ENVIRONMENT

(75) Inventors: Marc Jeston Byrd, San Jose, CA (US); Manish Krishriarao Kalbande, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 2999 days.

(21) Appl. No.: 09/867,645

(22) Filed: May 31, 2001

(65) Prior Publication Data

US 2002/0184144 A1    Dec. 5, 2002

(51) Int. Cl.
    *G06Q 40/00*      (2006.01)
(52) U.S. Cl. ........................................................ 705/40
(58) Field of Classification Search .................... 705/40
See application file for complete search history.

(56) References Cited

U.S. PATENT DOCUMENTS

| | | | |
|---|---|---|---|
| 5,287,270 A | 2/1994 | Hardy et al. |
| 5,465,206 A | 11/1995 | Hilt et al. |
| 5,511,190 A | 4/1996 | Sharma et al. |
| 5,652,786 A | 7/1997 | Rogers |
| 5,684,965 A | 11/1997 | Pickering |
| 5,699,528 A | 12/1997 | Hogan |
| 5,950,198 A | 9/1999 | Falls et al. |
| 6,044,362 A | 3/2000 | Neely |
| 6,058,380 A | 5/2000 | Anderson et al. |
| 6,070,150 A | 5/2000 | Remington et al. |
| 6,144,726 A | 11/2000 | Cross |
| 6,279,033 B1 | 8/2001 | Selvarajan et al. |
| 6,343,271 B1 | 1/2002 | Peterson et al. |
| 6,360,211 B1 | 3/2002 | Anderson et al. |
| 6,381,587 B1 | 4/2002 | Guzelsu |
| 6,499,137 B1 | 12/2002 | Hunt |
| 6,507,826 B1 | 1/2003 | Maners |
| 6,519,571 B1 | 2/2003 | Guheen et al. |

(Continued)

FOREIGN PATENT DOCUMENTS

WO    WO 01/25906 A1    4/2001

OTHER PUBLICATIONS

PR Newswire. "Sun-Netscape Alliance's New Internet Billing Consolidation Application to Help Make Internet Billing a Reality for Consumers." New York: Dec. 6, 1999 p. 1 (4 page).*

(Continued)

*Primary Examiner*—Kambiz Abdi
*Assistant Examiner*—Jennifer Liversedge
(74) *Attorney, Agent, or Firm*—Marsh Fischmann & Breyfogle LLP; Kent A. Lembke

(57) ABSTRACT

Methods and systems consistent with the present invention provide real-time customer profile and billing information in an IBPP environment. Specifically, in a bill presentment and payment system with a scheduled time to communicate billing information with a set of billers, customer registration information, including identification information, is received. A request, including the customer identification information, is provided to a biller, outside of the scheduled time for communication. The customer is thus permitted access to the billing information at an unscheduled time.

28 Claims, 5 Drawing Sheets

U.S. PATENT DOCUMENTS

| | | |
|---|---|---|
| 6,578,015 B1 * | 6/2003 | Haseltine et al. ............... 705/34 |
| 6,594,647 B1 | 7/2003 | Randle et al. |
| 6,658,488 B2 | 12/2003 | Peters et al. |
| 6,728,947 B1 | 4/2004 | Bengston |
| 2001/0047332 A1 | 11/2001 | Gonen-Friedman et al. |
| 2001/0051919 A1 | 12/2001 | Mason |
| 2002/0062240 A1 | 5/2002 | Morinville |
| 2002/0143699 A1 | 10/2002 | Baumann et al. |
| 2002/0184610 A1 | 12/2002 | Chong et al. |
| 2002/0194127 A1 | 12/2002 | Randell et al. |
| 2002/0198830 A1 | 12/2002 | Randell et al. |
| 2003/0004874 A1 | 1/2003 | Ludwig et al. |
| 2003/0167229 A1 | 9/2003 | Ludwig et al. |
| 2003/0191710 A1 | 10/2003 | Green et al. |

OTHER PUBLICATIONS

Kumar VORA et al., U.S. Appl. No. 60/258,087, "Integrated Identity and Access Management Systems With Group and Organization Managers," filed Dec. 22, 2000.

Christine Chan et al., U.S. Appl. No. 60/285,524, "Integrated Identity and Access Management System," filed Apr. 20, 2001.

U.S. Appl. No. 60/263,574, filed Jan. 22, 2001, Mandyam et al.

* cited by examiner

METHODS AND SYSTEMS FOR DELIVERY OF INFORMATION UPON ENROLLMENT IN AN INTERNET BILL PRESENTMENT AND PAYMENT ENVIRONMENT

DESCRIPTION OF THE INVENTION

1. Field of the Invention

This invention relates to Internet bill presentment and payment environments and, more particularly, to methods and systems for delivering customer profile and billing information upon enrollment in such environments.

2. Background of the Invention

Recurring bills (such as credit card bills, utility bills, and insurance bills) are traditionally mailed to customers by billers. Upon receiving bills, customers write checks (or provide some other monetary equivalent) and then mail the checks to the billers. This traditional scheme is inconvenient and time-consuming for both customers and billers.

Internet bill presentment and payment (IBPP) systems offer an attractive solution for the problems posed by traditional billing schemes. IBPP systems permit customers to view, store, and even pay recurring bills using a Web browser, e-mail, or personal financial management software. Because a biller, for example, simply posts the bill on-line, the biller avoids the inconvenience of having to print and distribute bills. Customers can view bills on-line, often at any time of day and at any point during the billing cycle. This convenience is not typically available in traditional billing schemes. Some IBPP systems also offer a service that enables customers to pay bills on-line without having to mail checks to billers, another convenience and time-saving over traditional billing schemes.

Further, electronic payments are beneficial to both customers and billers. Customers are able to more accurately manage their personal finances because they know exactly when a debit will be made from an account to pay a bill electronically, as opposed to waiting for the corresponding biller to receive the check and then waiting for an associated bank to clear the check. Billers typically receive funds more quickly due to the electronic debiting.

Other benefits may also be realized by both customers and billers using IBPP systems. Enhanced customer service is one such benefit. For example, customers may access a list of frequently-asked questions from an IBPP Web site, submit change-of-address information using on-line forms, or submit billing questions or disputes using e-mail. In the traditional billing scheme, these tasks often required a customer to call a biller, typically resulting in a delay as the customer waited on hold for assistance from a representative of the biller. Billers may also be able to gather market intelligence based on customer profiles. While a traditional biller may know a customer's name and address, on-line registration at Web sites frequently includes additional questions, such as family status and household income. The biller may further use this demographic information to provide targeted marketing, either electronically, in the form of e-mail or banner ads, or by traditional mailings.

Additionally, IBPP systems provide new opportunities for revenue generation. For example, larger billers or banks may offer a hosting service for other, smaller companies' bills to attract customers to a one-stop bill payment environment. Not only does this consolidation provide additional convenience and time-saving to customers, but the hosting service may permit a smaller company to provide electronic bills that would not otherwise have the means to do so. The customer and/or the smaller company may be charged a fee for this service, while the added expense to the larger biller is minimal.

More generally, a third party may provide IBPP service as a consolidator. Consolidators provide customers with access to billing data from one or more billers. Consolidators may be billers and/or may act as intermediaries between customers and billers. For example, a customer may visit a single Web site of a consolidator to view and pay bills for both a utility company and a credit card company. The term "consolidator", as used in the following description, refers to any IBPP system that is requesting billing data. The term "biller", as used in the following description, refers to any IBPP system having billing data.

Enrollment in an IBPP program provided directly by a biller may permit customers access to billing data within minutes of registration. Because the customer is accessing the biller's own data via the biller's Web site, it may not be necessary to send an external request to obtain the desired information. On the other hand, enrollment in an IBPP program provided by a consolidator may involve a turnaround of days, or even a full billing cycle, before the consolidator can present billing data to customers.

One reason for delay is that requests, as well as billing information, are often sent between billers and consolidators in scheduled batches, for example, at the end of the day. In this situation, the best-case scenario would involve at least a delay of one day between initial registration with a consolidator and the first time billing information is available for viewing. For example, at some point during the day, a customer enrolls in a consolidator's IBPP program. The customer, upon enrolling, indicates one or more billers whose billing data the customer wishes to access on-line. At the end of the day, or whenever the batch requests are scheduled, the customer's request is forwarded from the consolidator to the selected biller(s). The biller(s) then determine if the customer's request is valid (i.e., if the customer has an account with biller and if the account can be accessed and paid electronically). If a biller determines the request is valid, the biller sends billing data to the consolidator with the next scheduled batch of data, or may wait until the next billing cycle.

Further, billers may index and/or store data in numerous different ways. Consolidators may be required to formulate different requests for each biller to ensure accurate retrieval. Additionally, the retrieved data itself may need to be transformed, by either a biller or a consolidator, for the data to be properly formatted for presentation to the customer. Thus, IBPP systems often must be biller-dependent, either incurring substantial overhead in cost and time by consolidators and/or billers or limiting the billers to which customers have access from a consolidator's Web site.

SUMMARY OF THE INVENTION

It is therefore desirable to have a method or system that permits real-time delivery of customer profile and billing information in an IBPP environment. Further, it is desirable to have a method or system that minimizes the overhead incurred by the requesting IBPP system and/or the biller by reducing the extent of biller-dependent modules, or modules that must be designed specially for each biller.

Methods and systems consistent with the present invention provide real-time customer profile and billing information in an IBPP environment. Specifically, in a bill presentment and payment system with a scheduled time to communicate billing information with each one of a set of billers, a request, including the customer identification information, is provided to a biller, outside of the scheduled communication time. The biller provides billing information for that customer so the customer can access to the billing information at an unscheduled time with respect to the scheduled time for communicating with billers.

Further, in a bill presentment and payment system with a scheduled time for communicating billing information with a requesting IBPP system, there is provided a method for providing billing information. A request for information is received from a requesting IBPP system. The requested information is retrieved. The retrieved information is then forwarded to the requesting IBPP system at an unscheduled time.

In accordance with one implementation of the invention, a system is provided for delivering information from a biller to a customer upon enrollment in an Internet bill presentment and payment environment. The system includes a consolidator module connected to a biller module. The biller module contains biller-independent submodules for communicating with the consolidator module and biller-dependent modules for retrieving information from data stored by the biller. An interface is provided to permit the biller-independent submodules to interact with the biller-dependent submodules.

Additional features of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several implementations of the invention and, together with the description, serve to explain the principles of the invention. In the Figures.

DETAILED DESCRIPTION

Overview

Figure 1:
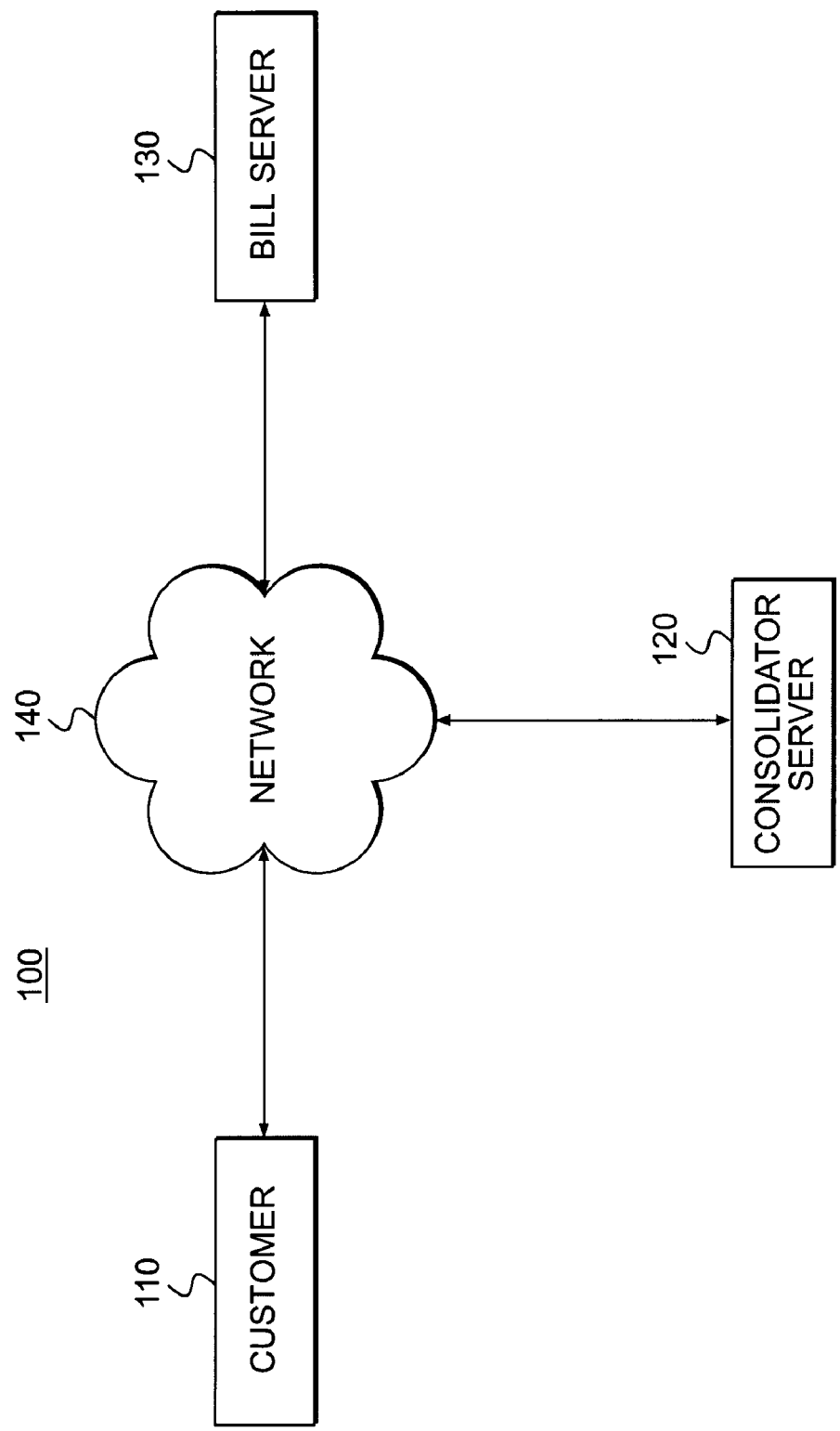
FIG. 1 is an exemplary Internet bill presentment and payment environment in which methods and systems consistent with the present invention may be implemented.

Systems and methods consistent with the present invention permit customers real-time access to billing information from one or more billers via a consolidator's Web site. Generally, customers receive goods, services, or value from a biller, and thus, owe the biller a sum of money. Billers typically have information about the sum of money owed and may also have information associated with the transaction(s) leading to this debt. For example, if the biller is a credit card company, the biller may have information about the total amount owed and the amount of minimum payment required. The biller may also have further information, such as details about the credit card purchases made and any related finance charges. Similarly, if the biller is a utility company, the biller may have not only information about the amount owed, but also information about the usage of the utility. The biller may provide some or all of this information to a consolidator, upon request, who displays the information to a customer.

Customers wishing to view billing information on-line may enroll in an IBPP program provided by a consolidator. Typically, customers may enroll with the consolidator via the consolidator's Web site. For example, selection of a "Registration" link on the consolidator's Web site may retrieve an on-line registration form to be filled out by a customer. The on-line form may be composed of different fields, where the customer is prompted to enter identification information such as name, address, phone number, and social security number. Additionally, the customer may be prompted to enter information to select or identify billers for which they desire to utilize on-line billing services. For example, the customer may provide, for each chosen biller, the biller's name, address, associated account number, and/or personal identification number (PIN). Alternatively, the customer may select from a list of predetermined billers provided by the consolidator.

Based on the identification and biller information provided by the customer, the consolidator formulates a request for each biller. The request is then sent to each biller immediately after formulation. The consolidator does not delay sending the request until some other time agreed in advance for communication with the biller. At each biller, the request may then be validated to ensure the request comes from an accepted source and/or contains sufficient data. Information, such as time of the request and data about the consolidator from which the request was received, may also be logged by the biller. Next, the biller generates an implementation object based on the request. The implementation object is biller-specific and is based on, among other things, how the biller stores data.

The implementation object validates the customer's credentials, such as by verifying the customer's name and account number. Following validation, the implementation object retrieves data from a data repository associated with the biller. Because the implementation object is biller-specific, it can retrieve the data, regardless of how it is stored in the data repository. The implementation object, however, may transform the data into a format agreed upon by the consolidator and biller. The implementation object then sends the data to the consolidator, who displays the data to the customer. Unlike the biller, the consolidator does not maintain a long-term store of billing data; rather, the consolidator displays retrieved billing data to the customer. The elapsed time between sending the request and displaying the data is in the range of seconds to minutes. This provides the customer with real-time or near real-time access to billing data, as opposed to limiting customer access to billing data until after some later scheduled time when the biller may communicate with the consolidator.

The following description of implementations of this invention refers to the accompanying drawings. Where appropriate, the same reference numbers in different drawings reference same or similar elements.

An IBPP System

FIG. 1 illustrates an exemplary Internet bill presentment and payment (IBPP) system 100 that permits real-time access to customer profile and billing data. System 100 includes a customer computer 110, a consolidator server 120, and a biller server 130 interconnected by network 140. Customer computer 110 has an interface for accessing a consolidator's Web site. Consolidator server 120 includes software to perform a process for communicating with customer computer 110 as well as instructions for communicating with biller server 130 and presenting billing data to customer computer 110. Biller server 130 includes software to perform a process for communicating with consolidator server 120. Network 140 may be the Internet, a local area network, or a wide area network. Although only one customer computer, one consolidator server, and one biller server are illustrated as comprising the exemplary IBPP system 100, one skilled in the art will appreciate that the exemplary IBPP system 100 may include additional customer computers, consolidator servers, and/or biller servers.

Figure 2:
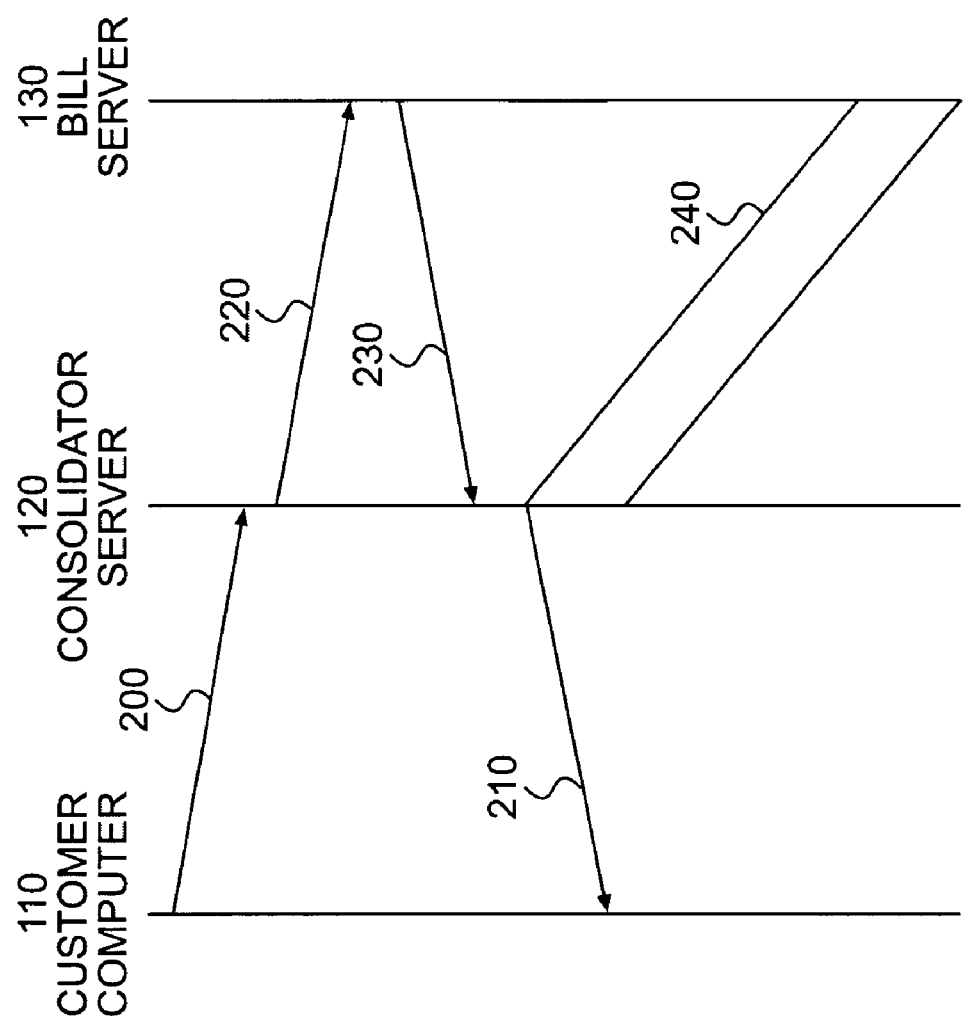
FIG. 2 is a flow diagram illustrating communication of information between entities in the bill present and payment environment as shown in FIG. 1.

FIG. 2 illustrates communication flow between customer computer 110, consolidator server 120, and biller server 130 over network 140. For example, customer computer 110 may send identification information and/or requests for billing data 200 to consolidator server 120. In turn, after enrolling customer 110 and obtaining the billing data from biller server 130, consolidator server 120 may send billing data 210 to customer 110. Requests for billing data 200 and billing data 210 may include instructions and/or data formatted in any language understood by both customer computer 110 and consolidator server 120.

Further, consolidator server 120 may send requests or, if already enrolled, billing data requests, 220 to biller server 130. Biller server 130 may respond to the request by sending detailed billing statements 230 to consolidator server 120. Requests 220 and detailed billing statements 230 may include instructions and/or data formatted in Biller Extensible Markup Language (Biller XML), for example, as provided in the Bill Data Exchange (BDX) protocol. Because the consolidator and the biller have a relationship whereby they agree to communicate using this language, requests and information may be sent outside of scheduled batches. For example, all of the above detailed communications take place outside of scheduled communication period 240.

BDX supports the following messages for communication between the consolidator and the biller: a message for the consolidator to begin interacting with the biller (BDXSIGNON RQ/RS); a message for validating of the customer information (VALIDATECUSTOMER RQ/RS); a message for retrieving a customer profile (PRESCUSTOMERPROFILE RQ/RS); a message for retrieving a customer bill (PRESCUSTOMERBILL RQ/RS); and a message for retrieving both customer profile and bill data (PRESCUSTOMERDATA RQ/RS). In all of the above messages, the RQ suffix is used to denote a request, the RS suffix denotes a response. For example, a portion of a request to validate the customer may include the following code:

<VALIDATECUSTOMERRQ>
<CUSTOMER INFO>
</CUSTOMER INFO>
<VALIDATECUSTOMERRQ>

Figure 3A:
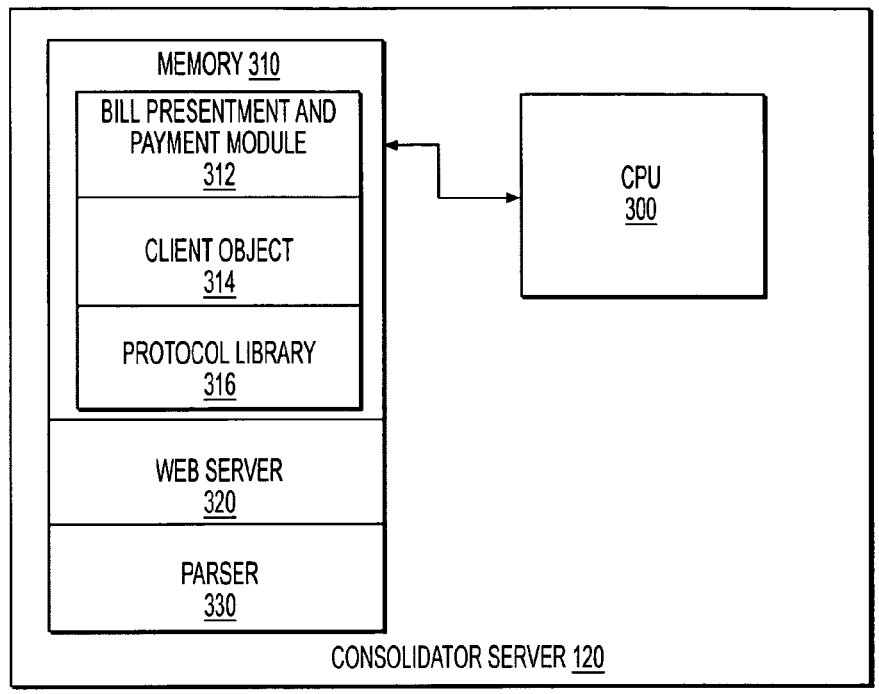
FIG. 3A is a detailed block diagram of the consolidator server illustrated in FIG. 1.

FIG. 3A illustrates the consolidator server 120 in greater detail. Consolidator server 120 includes a central processing unit (CPU) 300 and a memory 310. Memory 310 may include instructions for implementing an IBPP program, such as a bill presentment and payment (BPP) module 312, a client object 314, and a protocol library 316. Memory 310 may also include a web server 320 and a parser 330. Web server 320 facilitates communication between consolidator server 120 and biller server 130. Parser 330 permits consolidator server 120 to resolve instructions received from biller server 130 via Web server 320.

BPP module 312 facilitates the display of customer profile and billing information to a customer using a Web site and/or e-mail notifications. For example, a customer may log-in to a consolidator's Website and may choose from a list of enrolled billers. Upon selection of a biller, the system retrieves the data from the biller, and displays on the customer's browser a bill, which may be formatted similar to a traditional paper-based bill. Further, there may be provided a link, such as a "Pay Now" button, that may provide electronic commerce capabilities. BPP module 312 also includes a registration interface for new customers or for existing customers who wish to receive bills from additional billers via the IBPP program. The registration interface may prompt the customer to enter identification information, including customer name, address, phone number, or social security number, and account information, such as biller name, address, and account number.

Client object 314 receives the identification and/or account information obtained by the registration interface of the BPP module 312. Using this data, client object 314 formulates a request. Client object 314 sends the request to biller server 130 associated with each biller identified by the customer immediately after formulating the request. When the requested data is returned from biller server 130, client object 314 may forward the data to BPP module 312.

Protocol library 316 includes the necessary data and classes to implement a communication protocol between consolidator server 120 and biller server 130. For example, Bill Data Exchange (BDX) protocol may be used to provide communication between consolidator server 120 and biller server 130. BDX protocol is similar to Internet Financial Exchange (IFX) protocol; however, BDX protocol uses Biller XML as a data format. The use of Biller XML as a data format permits the requested data to be sent directly to BPP module 312, which is also using Biller XML, without requiring further conversion. It should be understood, however, that any protocol understood by the consolidator server 120 and the biller server 130 may be used.

Figure 3B:
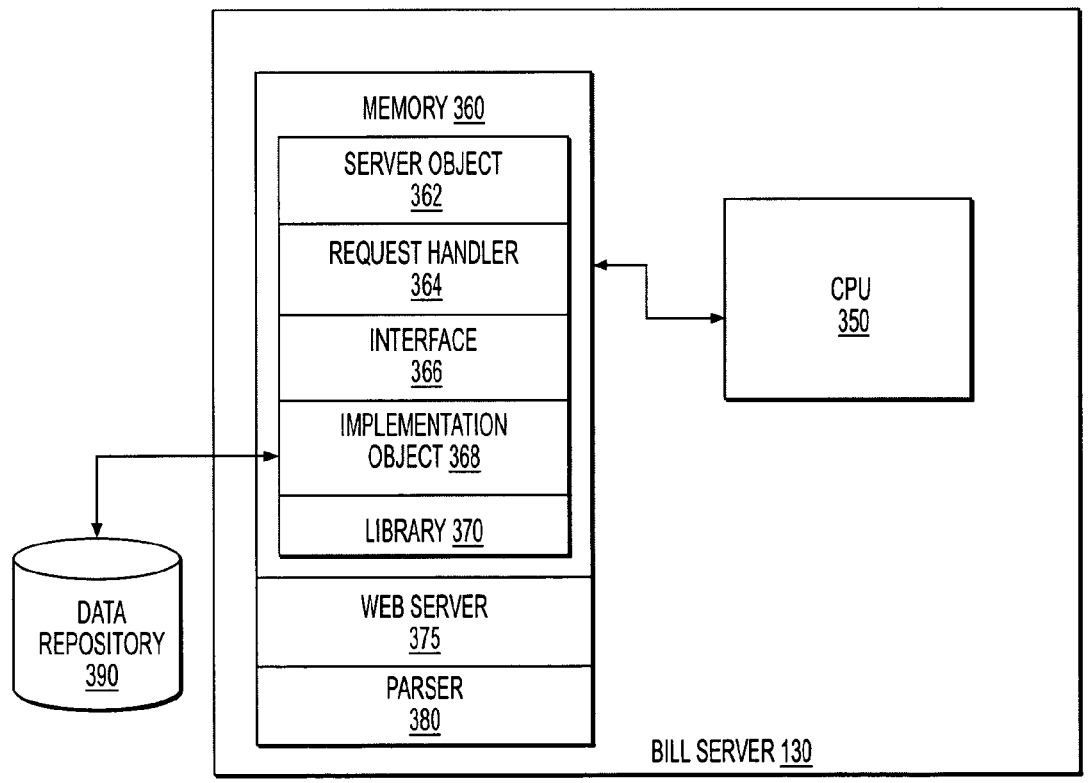
FIG. 3B is a detailed block diagram of the biller server illustrated in FIG. 1.

Similarly, FIG. 3B illustrates the biller server 130 in greater detail. Biller server 130 includes a CPU 350 and a memory 360. Memory 360 may include instructions for receiving requests for and retrieving billing information, such as a server object 362, a request handler 364, an interface module 366, an implementation object 368, and a library 370. Memory 360 may also include a Web server 375 and a parser 380. Web server 375 facilitates communication between consolidator server 120 and biller server 130. Parser 380 permits biller server 130 to resolve instructions received from consolidator server 120 via Web server 375. Biller server 130 is connected to data repository 390.

Server object 362 may be implemented as a servlet running on the biller server 130. Server object 362 receives enrollment and data requests from client object 314, running on consolidator server 120. Server object 362 may verify and validate a request, log information about the request, and then forward the request to request handler 364. Additionally, once the requested data has been retrieved, server object 362 forwards the data to client object 314.

Request handler 364 receives the request from server object 362, and calls a specific implementation object 368, depending on the biller associated with the request. Implementation object 368 then implements interface 366. Interface 366 facilitates the use of different implementation objects 368 for each biller, while permitting the other components of system 100 to be independent of the biller. Interface 366 will interact with each implementation object 368 to determine whether the customer's request is valid, and if it is, to obtain the customer profile and billing data.

Implementation object 368 may be responsible for validating the customer's credentials based on information stored in data repository 390, and for retrieving the requested data from data repository 390. Implementation object 368 may vary for each biller, and may depend on how the particular biller indexes the data stored in data repository 390 and how the data is formatted. The same biller may have multiple implementation objects 368, if the biller has two or more data repositories 390 in which data is stored differently. If more than one biller stores data in the same manner, it is possible to reuse implementation object 368. Further, if implementation object 368 is so designed, it may be able to access data of different billers, even if the billers store data in different formats.

Library module 370 includes a protocol library, such as the BDX library described above, and/or any other library to facilitate communication between the consolidator application server and the biller application server. Further, library module 370 may include a mapping library, such as an ECX library, for mapping data from the format in which it is stored in data repository 390 (for example, in legacy format) to the format used by the bill payment and presentment module 312, such as Biller XML.

Data repository 390 includes a data storage device such as a database, a Lightweight Directory Access Protocol (LDAP) directory, or other file system. Data repository 390 is maintained and formatted by the biller. Preferably, data stored in data repository 390 is indexed based on customer information, allowing for easy retrieval. Data repository 390 may reside on the same server as biller server 130, or may reside separately.

The system, as described above, is largely biller-independent in that most of the components are not created especially for a particular biller, but can be reused for all billers. The entire system is uniform but for the implementation object 368. Interface 366 specifies the calls that will be made to the implementation object 368, and the data expected. For example, interface 366 may include the call "isValidCustomer", to which the expected response will include either "SUCCESS" or "FAILURE". The biller provides an implementation object 368, responsive to the calls specified by interface 366, that accesses the data repository 390 as formatted. How implementation object 368 determines whether a customer is valid or accesses the rest of system 100. Interface 366 simply specifies the calls and expects certain responses in return. Thus, the system is largely independent of the biller and how the biller indexes, formats, and stores customer identification and billing data.

Figure 4:
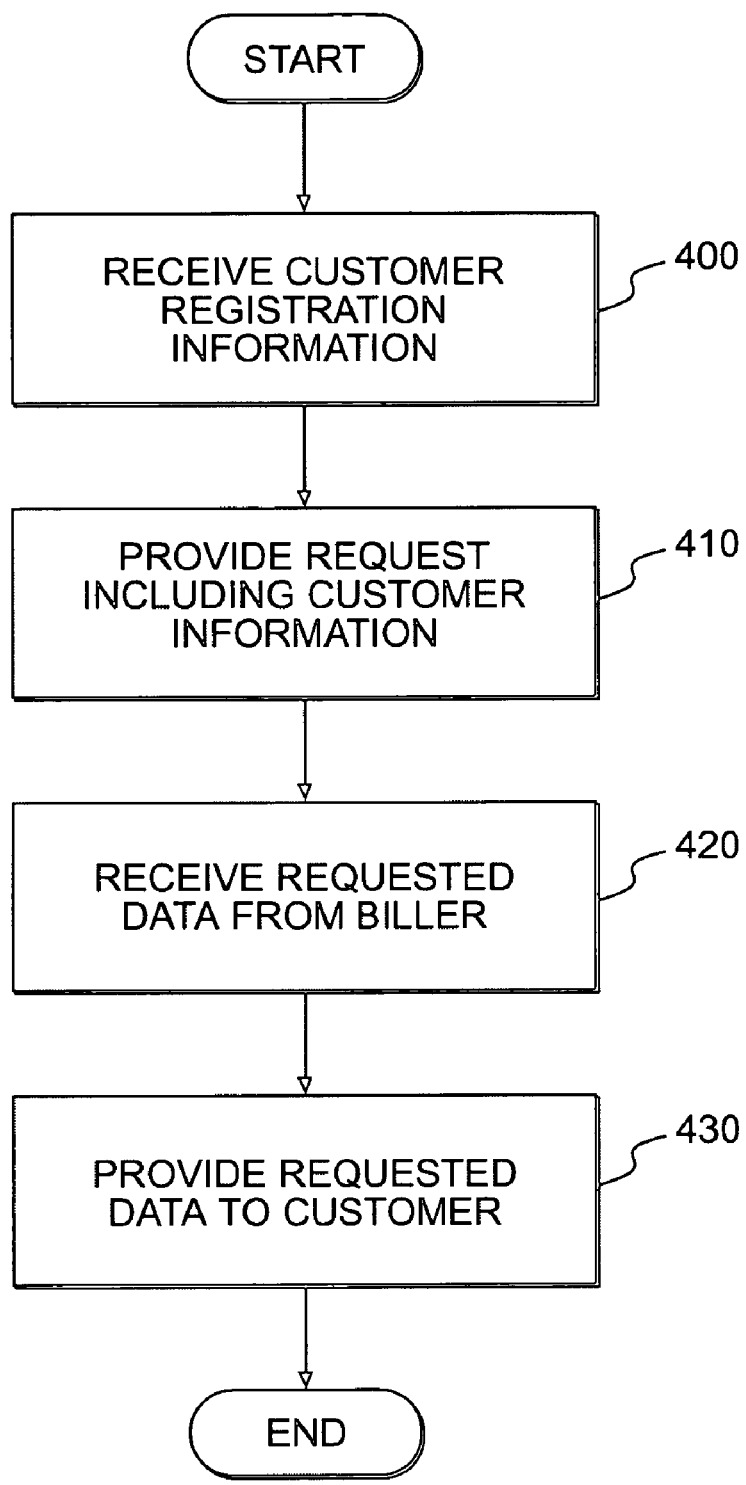
FIG. 4 is an exemplary flow chart illustrating the steps of a consolidator server process, consistent with the present invention.

FIG. 4 illustrates the steps of a consolidator server 120, consistent with the present invention. First, consolidator server 120 receives registration information from a customer (step 400). For example, BPP module 312 may provide a customer interface on the consolidator's Web site. A customer may access this Web site and click on a "Register" button or other similar interface feature. Upon A receiving the registration request, BPP module 312 may prompt the client to enter identification information and/or billing information. For example, BPP module 312 may prompt the customer to provide identification information such as the customer's full name, address, telephone number, e-mail address, date of birth, or social security number. Additionally, the customer may be prompted to enter billing information, including the biller's name, the biller's address, or the customer's account number. The customer may also be prompted to enter a password to ensure security on future visits to the consolidator's Web site.

Based on the information provided by the customer, client object 314 will construct a request and send the request immediately to biller server 130, via Web server 320 (step 410). This request may be sent using the BDX protocol described above. The BDX protocol operates on HTTP/HTTPS, where HTTPS may be used for secure transmissions. For additional security, the request may also include client identification and a client password. The server object 362 may use the client identification and client password to validate the request, as well as to maintain a record of requests made by client object 314.

Shortly after sending the request, client object 314 will receive the requested data from the biller (step 420). This requested data may include the customer's profile and/or billing information. Depending on the type of consolidator, the billing information may include either full billing details or may include only a summary of billing details. If the request is denied by the biller, client object 314 will receive an error message. The error message may indicate a reason for the denial of the request.

The time elapsed between a customer submitting registration information and receiving the requested billing data may be represented as a summation of the time for the client object 314 to construct and send a request, the round-trip network time for the request to travel to the server object 362 and the response to travel to the client object 314, the time to validate the request and retrieve the data from data repository 390, the time to transform data, and the time for the server object 362 to construct and send the response including the requested data to the client object 314. The times for constructing and sending the request and response are minimal. The round-trip network time is dependent on the network being used. The network time may also be minimized by running both the client object 314 and the server object 362 on the same instance of an application server. The time for retrieving the data may be minimized by if data repository 390 is indexed. The time to transform data depends on the complexity of the transformation map and the format of the data stored in data repository 390. Preferably, the total time elapsed is one minute or less.

Finally, the bill presentment and payment module 312 may provide the requested data to the customer (step 430). The customer is able to view their customer profile and billing information via the consolidator's Web site. Additionally, the customer may be able to modify their customer profile. In this situation, BPP module 312 may provide the updated profile to the client object 314, which sends the updated information to server object 362 for further handling. The customer may also be able to pay the bill from the consolidator's Web site.

Figure 5:
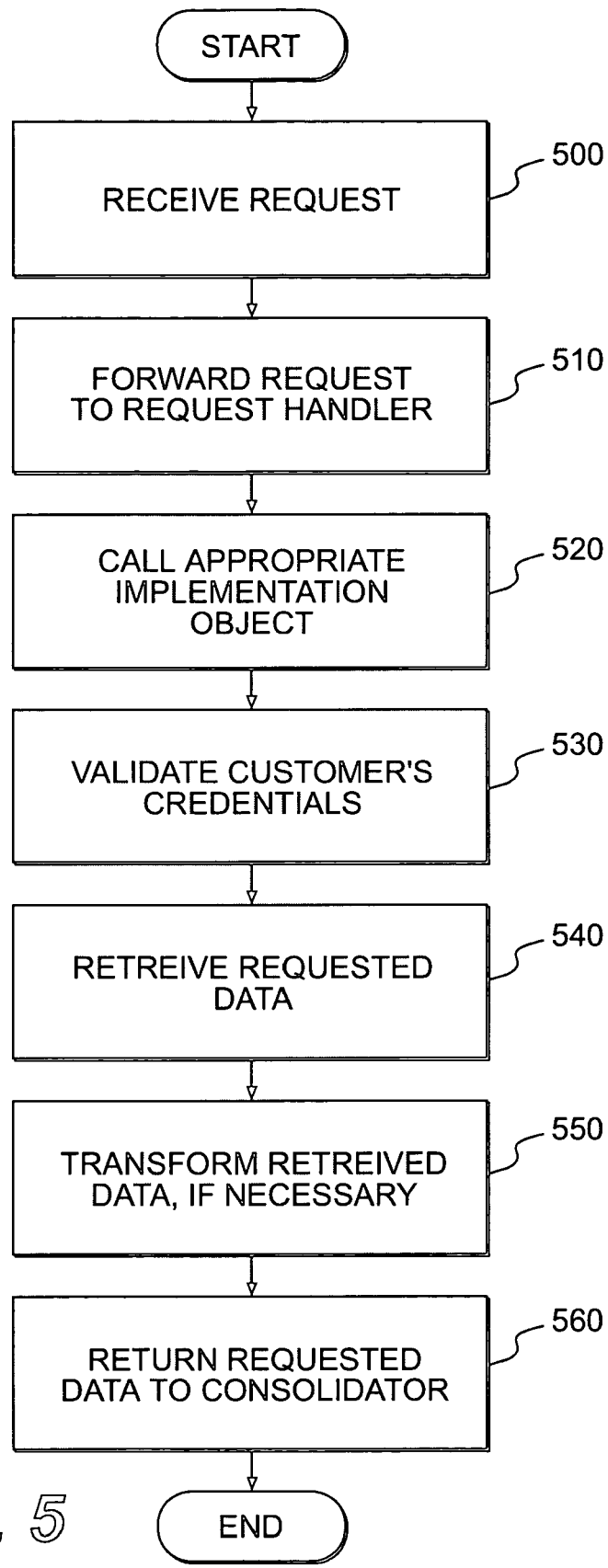
FIG. 5 is an exemplary flow chart illustrating the steps of a biller server process, consistent with the present invention.

FIG. 5 illustrates the steps of biller server 130 consistent with the present invention. First, server object 362 receives a request from client object 314 (step 500). The request may include customer identification and billing information. Additionally, the request may include client identification and a client password. Server object 362 may ensure that the request is valid (i.e., from an authorized client, including sufficient information for processing). Server object 362 may also log information about the request, including, for example, the type of request, the source of the request, or the arrival time of the request. Server object 362 then forwards the request to request handler 364 (step 510). Request handler 364 will then call an implementation object 368, depending on the biller associated with the request (step 520). The implementation object 368 called by request handler 364 will implement interface 366. Interface 366 permits interaction between implementation object 368 and the remainder of system 100, even though implementation object 368 is dependent on the biller.

Implementation object 368 then validates the customer's credentials (step 530). Implementation object 368 may compare parameters received as part of the request, such as social security number, name, account number, or other information with information stored in data repository 390. If there is no match, an error is returned to request handler 364.

If the customer's credentials are valid, implementation object 368 retrieves the requested data, such as customer profile and/or billing information, from data repository 390 (step 540). Preferably, data stored in data repository 390 is sufficiently indexed by customer identification information to promote quick data retrieval. Implementation object 368 may also transform the retrieved data (step 550), if the data as stored in data repository 390 is not in the same format as used by bill presentment and payment module 312. For example, implementation object 368 may transform legacy data to Biller XML format using mappings included in an ECX library stored in libraries 370. Finally, implementation object 368 passes the requested data to request handler 364 through interface 366. Request handler 364, in turn, passes the data to the server object 362, which returns the data to client object 314 for display by bill presentment and payment module 312 (step 560).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. In a bill presentment and payment environment with a scheduled time to communicate billing information with a set of billers, a bill presentment and payment method comprising:
    receiving, from a customer computer and at a client object of a consolidator server of an Internet bill presentment and payment (IBPP) system, customer registration information, including information sufficient to identify the customer;
    providing, by the client object of the consolidator server, the customer identification information to one of the billers as part of a first request indicating enrollment in the bill presentment and payment system, said customer information being provided to a biller server associated with the biller, the biller server including a server object, a request handler, connected to the server object, and an implementation object which receives requests from the request handler; and
    upon validation of the customer information by the server object of the biller server, permitting access by the customer to billing information from the one of the billers at an unscheduled time.

2. The method of claim 1, wherein permitting access by the customer to billing information comprises:
    transmitting a second request to the one of the billers to access billing information; and
    receiving the billing information from the one of the billers.

3. The method of claim 1, wherein the first request is independent of the biller.

4. The method of claim 1, wherein the billing information includes at least one of a customer profile or billing data associated with the customer.

5. The method of claim 1, wherein the customer identification information includes one or more of name, address, phone number, e-mail address, social security number, date of birth, or account number.

6. In a bill presentment and payment environment with a scheduled time to communicate billing information with a requesting Internet bill presentment and payment (IBPP) system, a method for providing billing information comprising:
    receiving, by a server object of a biller server having a request handler connected to the server object and an implementation object which receives requests from the request handler, and from a client object of a requesting IBPP system, a request for information associated with a customer, wherein the request is verified and validated by the server object;
    retrieving the requested information; and
    forwarding the retrieved information to the requesting IBPP system at an unscheduled time.

7. The method of claim 6, wherein the step of forwarding the retrieved information comprises the steps of:
    transforming the retrieved information to a format accepted by the requesting IBPP system; and
    forwarding the transformer information to the requesting IBPP system.

8. A system for permitting real-time access by a customer to billing information in an Internet bill presentment and payment environment, the system comprising: a consolidator server; and a biller module, connected to the consolidator module, wherein the biller module includes biller-independent submodules for communicating with the consolidator module; biller-dependent modules for retrieving information from data stored by the biller; and an interface enabling the biller-independent submodules to interact with the biller-dependent submodules, wherein the biller module includes: a server object, which receives a request from the consolidator module; a request handler, connected to the server object; and an implementation object which receives the request from the request handler.

9. The system of claim 8 wherein the consolidator server includes:
    a bill presentment and payment module; and
    a client object, connected to the bill presentment and payment module.

10. The system of claim 9, wherein the bill presentment and payment module provides an interface for accepting registration and requests from the customer.

11. The system of claim 8, wherein the server object, the request handler, and the implementation object are included in the biller-independent sub-modules.

12. The system of claim 11, wherein the implementation object is configured to implement the interface, based on information included in the request.

13. A computer-readable medium including instructions for performing a method in a bill presentment and payment environment with a scheduled time to communicate billing information with a set of billers, when executed by a processor, the bill presentment and payment method comprising:
    receiving, by a client object, customer registration information, including information sufficient to identify the customer;
    providing, by the client object to a server object, the customer identification information to one of the billers as part of a first request indicating enrollment in the bill presentment and payment system; and
    permitting, upon verification of the customer registration information by the server object through a request submitted via a request handler and an implementation object that receives the request from the request handler, access by the customer to billing information from the one of the billers at an unscheduled time.

14. The computer-readable medium of claim 13, wherein the step of permitting access by the customer to billing information comprises:
   transmitting a second request to the one of the billers to access billing information; and
   receiving the billing information from the one of the billers.

15. The computer-readable medium of claim 13, wherein the first request is independent of the biller.

16. The computer-readable medium of claim 13, wherein the billing information includes at least one of a customer profile or billing data associated with the customer.

17. The computer-readable medium of claim 13, wherein the customer identification information includes one or more of name, address, phone number, e-mail address, social security number, date of birth, or account number.

18. A computer-readable medium including instructions for performing a method, when executed by a processor, in a bill presentment and payment environment with a scheduled time to communicate billing information with a requesting IBPP system, for providing billing information, the method comprising:
   receiving, by a server object and from the requesting IBPP system, a request for information associated with a customer;
   retrieving, in response to a request from the server object to a request handler and from an implementation object that receives the request from the request handler, the requested information; and
   forwarding, by the server object, the retrieved information to the requesting IBPP system at an unscheduled time.

19. The computer-readable medium of claim 18, wherein the step of forwarding the retrieved information comprises the steps of:
   transforming the retrieved information to a format accepted by the requesting IBPP system; and
   forwarding the transformed information to the requesting IBPP system.

20. In a bill presentment and payment environment, a method of requesting information from a biller comprising:
   receiving, by a client object, customer registration information, including information sufficient to identify the customer; and
   providing, by the client object to a server object, the customer identification information to the biller as part of a request indicating enrollment in the bill presentment and payment system,
   wherein the request is provided to the biller in accordance with a bill data exchange protocol and upon verification of the customer registration information by the server object through a request submitted via a request handler and an implementation object that receives the request from the request handler, permitting access by the customer to billing information from the biller.

21. In a bill presentment and payment environment, a method of providing billing data to a requesting IBPP system, the method comprising:
   receiving, by a server object of a biller server having a request handler connected to the server object and an implementation object which receives requests from the request handler, and from a client object of the requesting IBPP system, a request;
   retrieving the billing data based on the request; and
   providing the retrieved data to the requesting IBPP system, wherein the retrieved data is provided to the requesting IBPP system in accordance with a bill data exchange protocol.

22. In a bill presentment and payment environment with a set of billers, a real-time bill presentment and payment method comprising:
   receiving, by a client object of a consolidation server, customer registration information, including information sufficient to identify the customer;
   providing, by the client object, the customer identification information to a biller server associated with one of the billers as part of a request indicating enrollment in the bill presentment and payment system; and
   upon verification of the customer registration information by the server object through a request submitted via a request handler and an implementation object that receives the request from the request handler, permitting real-time access by the customer to billing information from the one of the billers.

23. The method of claim 22, wherein permitting access by the customer to billing information comprises:
   transmitting a request to the one of the billers to access billing information; and
   receiving the billing information from the one of the billers.

24. The method of claim 22, wherein the request is independent of the biller.

25. The method of claim 22, wherein the billing information includes at least one of a customer profile or billing data associated with the customer.

26. The method of claim 22, wherein the customer identification information includes one or more of name, address, phone number, e-mail address, social security number, date of birth, or account number.

27. In a bill presentment and payment environment, a method for providing billing information to a requesting IBPP system in real-time, the method comprising:
   receiving, at a server object and from the requesting IBPP system, a request for information associated with a customer;
   retrieving, in response to a request from the server object to a request handler and from an implementation object that receives the request from the request handler, the requested information; and
   forwarding, by the server object, the retrieved information to the requesting IBPP system in real-time.

28. The method of claim 27, wherein the step of forwarding the retrieved information comprises the steps of:
   transforming the retrieved information to a format accepted by the requesting IBPP system; and
   forwarding the transformed information to the requesting IBPP system.

* * * * *

UNITED STATES PATENT AND TRADEMARK OFFICE
CERTIFICATE OF CORRECTION

PATENT NO. : 7,752,130 B2 Page 1 of 1
APPLICATION NO. : 09/867645
DATED : July 6, 2010
INVENTOR(S) : Byrd et al.

It is certified that error appears in the above-identified patent and that said Letters Patent is hereby corrected as shown below:

Column 10, line 23, claim 4 delete "transformer" and insert therefor --transformed--.

Signed and Sealed this

Thirty-first Day of August, 2010

David J. Kappos
*Director of the United States Patent and Trademark Office*